United States Patent Office 3,470,041
Patented Sept. 30, 1969

3,470,041
NITRIC ACID SENSITIZED CAP SENSITIVE EXPLOSIVES WITH GELATION CATALYST AND ENTRAPPED AIR
Neil E. Gehrig, Schuylkill Haven, Pa., assignor to Atlas Chemical Industries, Inc., Wilmington, Del., a corporation of Delaware
Continuation-in-part of application Ser. No. 604,202, Dec. 23, 1966. This application Jan. 29, 1968, Ser. No. 701,083
The portion of the term of the patent subsequent to Jan. 3, 1984, has been disclaimed
Int. Cl. C06b $19/04, 21/00, 1/00$
U.S. Cl. 149—2    9 Claims

ABSTRACT OF THE DISCLOSURE

A gelled emulsion blasting composition is disclosed which is prepared by a method wherein an aqueous solution of nitric acid; an inorganic nitrate; an immiscible fuel; an acid-resistant stabilizer, or an acid-resistant surfactant, or both; a gelation catalyst; and air are mixed to entrap the air and characterize the prepared blasting composition with a density of from about 0.5 gm./cc. to about 1.60 gm./cc.

---

This application for U.S. Letters Patent is a continuation-in-part of copending U.S. patent application Ser. No. 604,202, filed Dec. 23, 1966, now U.S. Patent No. 3,376,176, which in turn is a continuation of U.S. patent application Ser. No. 411,698, filed Nov. 17, 1964, now U.S. Patent No. 3,296,044.

This invention relates to blasting agents containing nitric acid as an essential component thereof and particularly to blasting agents which consist essentially of an aqueous solution of nitric acid; and inorganic nitrate; an immiscible carbonaceous fuel; an acid-resistant stabilizer, or an acid-resistant surfactant, or both; a gelation catalyst; and incorporated air. The prepared blasting agents have a density in the range of from about 0.5 gm./cc. to about 1.60 gm./cc.

The various suitable components, their proportions, and the physical form of the present invention are described in more detail in the following sections:

NITRIC ACID

The nitric acid component of the present mixtures preferably is an aqueous solution of nitric acid containing between about 30% and about 80% by weight of nitric acid. Aqueous solutions of about 60% by weight of nitric acid aptly suited to use in the present mixture are readily available in the commercial market. Such solutions are less reactive and much less expensive than more highly concentrated nitric acid solutions. Although a more highly concentrated nitric acid solution can be used in the present invention, the hazards of handling are not compensated by a substantial increase in the effectiveness of the final mixture. However, if desired, concentrated nitric acid and an appropriate amount of water may be separately added and incorporated into the mixtures. Since the nitric acid and water may be separately added to the present mixtures, the concentration of the aqueous solution of nitric acid is defined as $$\frac{\text{Total weight HNO}_3 \text{ in the mixture}}{\text{Total weight of NHO}_3 \text{ in the mixture}+\text{total weight of water in the mixture}} \times 100$$

Nitric acid having a concentration of less than about 30% frequently yields a product which is insensitive to normal detonation means. Nitric acid having a concentration of greater than about 40% is usually preferred and generally produces a final composition having a satisfactory detonation velocity and sensitivity.

AMMONIUM AND METAL NITRATE

While commercially available "fertilizer grade" ammonium nitrate is suited to use in the mixture of the present invention, sodium and potassium nitrates may also be used. Preferably, the nitrate component is in particulate form, that is, having a size that will pass a No. 8 U.S.S. screen. A nitrate component in particulate form, for example, in the form of prills, pellets, or granules, is aptly suited to use in the present mixtures. Generally, the gelled emulsion compositions will contain from about 20 to about 500 parts of an inorganic nitrate component selected from the group consisting of ammonium and alkali metal nitrates based on 100 parts by weight of aqueous nitric acid containing from about 30% to about 80% by weight of nitric acid.

IMMISCIBLE CARBONACEOUS FUEL MATERIAL

The compositions of the present invention include a fuel material which is immiscible with an aqueous solution of nitric acid. Generally hydrocarbons whether paraffinic, olefinic, naphthenic, aromatic, saturated or unsaturated are suitable as the carbonaceous fuel component. However, other materials such as saturated fatty acids, higher alcohols having a chain length of from about 6 to 18 carbon atoms, and liquid or solid polyethylene glycols are found to be generally suitable.

Examples of hydrocarbon fuels suitable in the subject invention are paraffin, paraffin-based waxes, diesel fuel oil, mineral oil and similar based petroleum products. Saturated fatty acids suitable for use in the invention include octanoic acid, decanoic acid, lauric acid, palmitic acid, behenic acid and cerotic acid.

Suitable higher alcohols include hexyl alcohol, nonyl alcohol, lauryl alcohol, cetyl alcohol and stearyl alcohol.

Other immiscible, carbonaceous fuels useful in the present invention are vegetable oils such as corn oil, cottonseed oil and soybean oil. Powdered carbon is also suitable to supply the required carbonaceous fuel component of the subject invention. Carbohydrate materials, for example, sugars in dry form, such as sucrose, or in solution, such as molasses, may be utilized as supplemental fuels. In addition, any carbonaceous fuel substantially unreactive with nitric acid on simple mixing may be used in the subject compositions as the fuel component.

Generally, the fuel material selected for use in the present invention will depend upon the desired physical form of the final product, i.e., if a more mobile product is desired, a liquid or semiliquid fuel is utilized; if a relatively solid product is desired, a predominantly solid fuel is utilized. Liquid fuels which are particularly suited for use in the slurry mixtures of the present invention are refined mineral oils which are liquids at normal temperatures and have a flash point about 100° F. No. 2 fuel oil is suited for use. The specifications for No. 2 fuel oil are well known and are set forth in the U.S. Department of Commerce Commercial Standard CS 12–48. No. 2 fuel oil has a flash point above 100° F., a 90% distillation point of 675° F. and a maximum Saybolt Universal viscosity at 100° F. of 125 seconds. Petroleum cuts sometimes referred to as low or partially refined oils are also suitable fuel components. Generally, the fuels for the present compositions are unreactive with nitric acid under normal conditions of mixing and storage, that is, little, if any, fumes of the oxides of nitrogen will noticeably be given off by the mixture. Paraffins or paraffinic-based waxes are eminently suited to use as an unctuous fuel component.

Generally, the present compositions contain about 6 to about 150 parts by weight of immiscible, carbonaceous fuel based on 100 parts by weight of nitric acid solution containing between about 30% and about 80% nitric acid.

ACID-RESISTANT SURFACTANT

The present compositions preferably contain small amounts of a suitable surfactant. Generally, up to about 50 parts by weight of surfactant based on 100 parts of an aqueous solution of nitric acid containing between about 30% and about 80% by weight of nitric acid is used to aid in obtaining and maintaining a homogenous mixture. Most often, from about 1.5 to about 30 parts by weight based on 100 parts of nitric acid solution of a surfactant suitably emulsifies the present mixtures; however, additional surfactant, up to about 50 parts may be added without noticeable harmful effects. The surplus surfactant may be beneficial in that it supplies an additional supplemental fuel to the mixture. Some of the surfactants that have been found to be suitable are sorbitan monooleate, sorbitan monopalmitate, and sorbitan monostearate.

ACID-RESISTANT STABILIZER

The present mixtures also include a small amount of a stabilizing material. Generally, between about 0.3 and about 50 parts by weight of stabilizer based on 100 parts by weight of nitric acid solution is used to aid in the formation of the subject stable gelled emulsions depending on storage requirements. In most cases, from about 1 to about 30 parts by weight based on 100 parts by weight of nitric acid solution of an acid-resistant stabilizer is used to stabilize the present emulsion; however, additional stabilizer, up to about 50 parts may be added without harmful effects. Some of the acid-resistant stabilizers that have been found to be suitable are colloidal silica, polymers and copolymers of acrylamide, copolymers of methyl vinyl ether-maleic anhydride, polyacrylic acid, and other water-soluble acrylic polymers. However, any acid-resistant stabilizer that will form a gel structure in the subject mixture is suitable.

A mixture of polymers and copolymers of acrylamide, sold under the trade name, "Cyanogum 41," a product of American Cyanamid Co., is a suitable stabilizer. Copolymers of methyl vinyl ether-maleic anhydride sold under the trade name "Gantrez" by the General Aniline and Film Co. are also suited to use. Various viscosity grades of "Gantrez" are available. Among those found suitable are "Gantrez AN–119" (low viscosity), "Gantrez AN–139" (medium viscosity), "Gantrez AN–149" (medium viscosity) and "Gantrez AN–169" (high viscosity).

CATALYSTS

A suitable catalyst is incorporated into the subject mixtures to promote the formation of the desired gelled structure. It appears likely that the subject catalysts act to increase the reaction rate between the components, thereby causing formation of a gelled emulsion possessing the desired properties. As a result of the rapid formation of this gelled emulsion, a cap sensitive explosive product is obtained whose sensitivity is retained during storage. Trivalent iron salts and trivalent aluminum salts have been found to act suitably as catalysts in the subject compositions. Suitable iron salts include ferric sulfate, ferric chloride and ferric nitrate.

Among suitable aluminum salts are aluminum sulfate, aluminum chloride and aluminum nitrate.

Tetravalent tin salts also act as gelation catalysts in the present compositions. Among suitable tin salts are stannic chloride, stannic nitrate and stannic sulfate.

Additional catalysts that perform satisfactorily in the subject compositions are polyethylenimine, polyethylenimine nitrate, diethylenetriamine, triethylenetetramine, rhodamine B and aminoglycerol.

Generally, from about 0.1 to about 66 parts by weight of catalyst based on 100 parts by weight of nitric acid solution is used in the subject compositions depending on storage requirements. Most often, from about 0.3 to about 30 parts by weight of a gelation catalyst is used based on 100 parts of nitric acid solution. Quantities below 0.3 part based on 100 parts nitric acid solution may produce an insufficient effect for prolonged storage requirements; however, additional catalyst up to about 66 parts may be added without noticeable harmful effects.

OTHER ADDITIVES

The compositions of the present invention may include other ingredients to modify the physical properties of the mixture. For example, ammonium nitrate or alkali metal nitrates may be initially treated with a thin coating of protective material to minimize attrition and caking of the particles. A thin coat of clay, diatomaceous earth, or organic agents, such as a mixture of sulfonates of mono- and/or dimethyl naphthalenes are frequently used as additives to particulate nitrates. Generally, the inorganic additives such as clay are present in an amount of from about 0.5 to about 5.0% by weight of ammonium or alkali metal nitrate. The organic additives are frequently effective in amounts as low as 0.05% by weight of the nitrate component.

The sensitivity and detonation velocity of the slurry and solidified dispersion forms of the present invention usually may be stabilized by the addition of an inert, nonexplosive propagation sustaining material, for example, expanded particulate perlite, or hollow glass balls. Generally, about 1 part by weight of the propagation sustaining material, based on 100 parts by weight of a 60% nitric acid solution, is required to obtain an advantage and usually more than about 70 parts fails to yield further improvement. Suitable propagation sustaining material has a size range that will pass through a No. 8 U.S.S. screen to a No. 100 U.S.S. screen. Expanded perlite, a commercially available material, is a useful mineral perlite generally characterized as a volcanic glass composed largely of aluminum silicate which has been put through a heating process so that it is expanded into an extremely light cellular form.

PHYSICAL FORMS OF MIXTURES

The compositions of the present invention may be compounded in various physical forms, for example, (1) an emulsion slurry form wherein an aqueous solution of nitric acid and an immiscible fuel are emulsified together preferably with ammonium nitrate; and (2) a solidified form wherein an aqueous solution of nitric acid, an immiscible fuel and ammonium nitrate are emulsified and solidified. The latter solid emulsion form is adapted to be further modified to produce mixtures which may be molded or cast and in a short period of time will harden to a solid mixture without further curing or treatment.

Emulsion slurry mixtures

The present invention provides blasting agents prepared in the form of an emulsion which may be compounded in slurry form. The blasting slurries contemplated by the present invention are generally semiliquid in nature. Since the mixtures of the present invention in slurry form contain an aqueous solution of nitric acid which may be compounded without ammonium nitrate, the proportions of the slurry mixture are based on the nitric acid component. Based on 100 parts by weight of an aqueous solution of nitric acid containing between about 30% and about 80% by weight of nitric acid, the slurry mixtures include from about 3 to about 65 parts by weight of an insensitive, immiscible, carbonaceous fuel independent of the amounts of surfactant and stabilizer. The slurry mixtures of the present invention may, in addition to nitric acid and fuel, contain an ammonium, potassium or sodium nitrate component. In such case, based on 100 parts by weight of an aqueous solution of nitric acid containing between about 30 and about 80% nitric acid, up to about 550 parts by weight of the nitrate component may be included. An advantage of the slurry mixtures of the present invention which contain nitric acid and either ammonium or potassium nitrate is that under normal conditions such mixtures exhibit neither the amount of normally titratable acidity nor the amount of corrosiveness that would be expected from the amount of nitric acid included in the mixture. The fuel component is immiscible in water and preferably is an unctuous material such as paraffin and refined mineral oil. Of the unctuous materials which are suited to use, materials which are liquid at ambient temperature are particularly useful. A suitable fuel fulfilling the requirements of the present invention is a refined hydrocarbon oil from which substantially all unsaturated hydrocarbons have been removed. Mixtures which contain relatively small amounts of nitric acid, as compared to the amount of the nitrate component, for example, those containing at least about 300 parts by weight of the nitrate component as compared to 100 parts by weight of nitric acid solution, are generally found to be thick, almost paste-like mixtures while mixtures containing a greater amount of nitric acid tend to be fluid and generally are quite flowable mixtures. The thick, almost paste-like mixtures frequently are suitable starting materials for producing the solid mixtures of the present invention which are described below. Because the slurry mixtures are fluid the particulate nitrate starting material need not be coated with clay or other parting agent. The aqueous nitric acid solution of the present invention exhibits a preferred sensitivity when they contain at least about 40% by weight of nitric acid.

The slurry mixtures of the present invention are in the physical form of stable gelled emulsions. The present gelled emulsions evidence no separation of components when stored at temperatures in the range of 75° to 85° F. for periods of at least 8 hours. Frequently the present gelled emulsions are stable for periods of 6 months or more.

An acid-resistant stabilizer in an amount between about 1 and about 10 parts based on the weight of the nitric acid solution component as 100, may be added to the slurry mixture to prevent separation of the components. Generally no stabilizer is required if the slurry is mixed and used in the same 24-hour period; however, where the slurry is to be stored a stabilizer is desirable. A high molecular weight copolymer of methyl vinyl ether-maleic anhydride is a useful stabilizer. The product sold under the tradename "Gantrez AN-169" by General Aniline & Film Corp. is a copolymer of methyl vinyl ether-maleic anhydride having a mol weight of about 1,250,000 and is suited for use. A low density colloidal silica is a useful stabilizer. The product "Cab-O-Sil M-5," manufactured by the Cabot Corporation is suited. Synthetic polymers and copolymers, particularly those of acrylamide, have been found suited to use as stabilizers. A mixture of such polymers and copolymers, sold under the tradename "Cyanogum 41," a product of American Cyanamid Co., is a suitable stabilizer. Other useful stabilizers, for example, are polyacrylic acid, and other water soluble acrylic polymers.

The present slurry mixtures may contain between about 2 and about 50 parts, based on the weight of the nitric acid solution as 100, of an acid-resistant surfactant capable of forming an amulsion of water in oil. Generally a minimum of about 3 parts is required to form a satisfactory oil emulsion between the unctuous fuel component and the aqueous solution of nitric acid. Any excess, to about 50% based on the weight of nitric acid, yields no noticeable ill effects and may be a supplement source of insensitive carbonaceous fuel. Sorbitan monopalmitate, sorbitan monooleate and sorbitan monostearate have been found to be acid resistant and suited to use in the emulsion slurries of the present invention.

The present slurry mixtures may contain an inert, non-explosive propagation sustaining material in an amount sufficient to stabilize the sensitivity and detonation velocity during storage of the slurries. Suitable propagation sustaining materials are, for example, perlite and hollow glass balls. Preferably the propagation sustaining materials are of a size that will pass a No. 8 mesh U.S.S. screen.

The mixtures of the present invention in slurry form may be compounded by mixing the proper proportions of an aqueous solution of nitric acid and insensitive, immiscible fuel material together. If an additional component such as a stabilizer or a surfactant is utilized, the additional component is preferably blended with and added along with the fuel material.

Blasting emulsions in slurry form are contemplated by the present invention. Preferably such emulsions are compounded by initially blending an acid-resistant surfactant with an insensitive immiscible fuel component. Preferably the fuel is a refined or partially refined oil, paraffin or paraffin-based wax. If sorbitan monooleate is used as the emulsifying component, it is desirable to mix the sorbitan monooleate with a small amount of water to facilitate solution of the sorbitan monooleate in the mixture. If a stabilizing component is to be utilized in addition to the surfactant, it may be added along with the fuel-surfactant blend. The fuel-additive blend is then thoroughly mixed with the ammonium nitrate component. The nitric acid component is added and slowly stirred into the mixture and the final product heated (to a temperature within the range of from about 80° F. to about 150° F.) to remove a portion of entrapped air. The latter heating step increases the density of the final mixture and produces a more stable emulsion.

Solidified mixtures

The prevent invention also contemplates solid mixtures which may be molded, cast or extruded into any desired shape. The solid mixtures of the present invention are related to the slurry emulsions described above, however, instead of remaining in slurry form the mixtures solidify. The solid mixtures of the present invention require that (1) the components be proportioned within rather specific ranges, (2) the final mixture be heated to form a melt and drive off excess entrapped air. The proportions of components which are suited to form solid mixtures overlap the range of components suited to provide a slurry form of the explosive. The slurry formulas in the overlap area are thick, almost paste-like mixtures and may be transformed into solid mixtures by extending the heating step. The solidified mixtures include ammonium, potassium or sodium nitrate as a component. On the basis of 100 parts by weight of an aqueous solution of nitric acid containing from about 30% to about 80% by weight of nitric acid, the solidified mixtures contain at least 300 parts by weight of the nitrate component. Generally satisfactory solidified mixtures based on 100 parts by weight of the nitric acid solution component contain between about 300 and about 550 parts of the nitrate component, from about 20 to about 80 parts by weight of a fuel component, and at least 6 parts by weight of an acid-resistant surfactant, such as sorbitan monostearate, sorbitan monopalmitate or sorbitan monooleate, as the emulsifying agent. Usually over 50 parts of surfactant, based on 100 parts of the nitric acid component, yields no obvious benefit. The solidified mixtures of the present invention may also include a stabilizer component. Suitable stabilizer components are described in the foregoing section describing slurry mixtures. If a stabilizer component is used, it usually produces no increase in effectiveness above about 20 parts by weight based on 100 parts of the nitric acid solution component. If any additives are utilized which meet the requirements for a fuel component, that is they are carbonaceous, immiscible and insensitive to detonation, their weight may be considered as additional fuel. Generally the mixtures of the present invention form a melt in a range between 100° F. and 135° F. and this temperature is sufficient to form the present solid mixtures. For safety purposes, it is preferred that the components be chosen so that the mixture has a melting point not substantially higher than about 150° F.

In general, the density of the present mixtures is determined by the amount of air entrapped in the mixture. A product having a density of well over 1 gm./cc. may be produced by removing a substantial amount of the entrapped air. Entrapped air may be removed by placing the mixture immediately after stirring, and before it has solidified, in an open vessel and heating. In order to insure that the solid mixture will have a satisfactory sensitivity to detonation, it is desirable that a small amount of air remain in the mixture. A product having a density of from about 0.5 gm./cc. to about 1.60 gm./cc. and having a satisfactory sensitivity to detonation may be produced by heating the mixture after stirring to a temperature sufficiently high to form a melt. Generally such temperature is in the neighborhood of about 100° F. It is desirable for safety purposes, that the components be chosen so that the melting step can be carried out at a temperature not significantly in excess of 150° F. A product having a density of from about 1.0 gm./cc. to about 1.4 gm./cc. is generally preferred.

This invention will be more readily understood from a consideration of the following examples of preferred embodiments.

EXAMPLES

Each of the examples set forth below are prepared according to the following procedure:

The nitrate, stabilizer and catalyst were combined and mixed one minute by means of mechanical agitation. The fuel and surfactant, when present, were blended together, mixed one minute and then added to the above mixture. The resulting combination was stirred one minute and then the nitric acid was incorporated therein under mechanical agitation. Lastly, the mixture was placed in suitable packaging for explosive use.

In the examples, all quantities of ingredients refer to parts by weight.

Example I

| Paraffin | 6.0 |
| Mineral oil | 2.0 |
| Sorbitan monopalmitate | 2.0 |
| "Gantrez AN-169" | 2.0 |
| Ferric sulfate | 1.0 |
| Sodium nitrate | 10.0 |
| Ammonium nitrate | 47.0 |
| Nitric acid (60%) | 30.0 |

Example II

| Paraffin | 6.0 |
| Sorbitan monopalmitate | 2.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 49.0 |

Example III

| Paraffin | 4.0 |
| Carbon (powdered) | 2.0 |
| Sorbitan monopalmitate | 2.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 49.0 |

Example IV

| Paraffin | 4.0 |
| Oleic acid | 2.0 |
| Sorbitan monopalmitate | 2.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 49.0 |

Example V

| Paraffin | 2.0 |
| Palmitic acid | 4.0 |
| Sorbitan monopalmitate | 2.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 49.0 |

Example VI

| Paraffin | 4.0 |
| Lauryl alcohol | 2.0 |
| Sorbitan monopalmitate | 2.0 |
| "Gantrez AN-119" | 2.0 |
| Ferric sulfate | 1.0 |
| Sodium nitrate | 10.0 |
| Nitric acid (60%) | 30.0 |
| Ammonium nitrate | 49.0 |

Example VII

| Paraffin | 4.0 |
| Cottonseed oil | 2.0 |
| Sorbitan monopalmitate | 2.0 |
| "Gantrez AN-119" | 2.0 |
| Ferric sulfate | 1.0 |
| Sodium nitrate | 10.0 |
| Nitric acid (60%) | 30.0 |
| Ammonium nitrate | 49.0 |

Example VIII

| Paraffin | 1.0 |
| Mineral oil | 0.5 |
| Sorbitan monopalmitate | 0.5 |
| "Gantrez AN-169" | 0.1 |
| Ferric sulfate | 0.1 |
| Sodium nitrate | 10.0 |
| Nitric acid (60%) | 30.0 |
| Ammonium nitrate | 57.8 |

Example IX

| Paraffin | 1.0 |
| Mineral oil | 0.5 |
| Sorbitan monopalmitate | 0.5 |
| "Gantrez AN-139" | 0.1 |
| Ferric sulfate | 0.1 |
| Sodium nitrate | 10.0 |
| Nitric acid (40%) | 30.0 |
| Ammonium nitrate | 57.8 |

Example X

| Paraffin | 14.0 |
| Mineral oil | 7.0 |
| Sorbitan monopalmitate | 7.0 |
| "Gantrez AN-139" | 1.5 |
| Ferric sulfate | 1.0 |
| Sodium nitrate | 10.0 |
| Nitric acid (60%) | 20.0 |
| Ammonium nitrate | 39.5 |

Example XI

| Paraffin | 14.0 |
| Mineral oil | 7.0 |
| Sorbitan monopalmitate | 7.0 |
| "Gantrez AN-169" | 1.5 |
| Ferric sulfate | 1.0 |
| Sodium nitrate | 10.0 |
| Nitric acid (40%) | 20.0 |
| Ammonium nitrate | 39.5 |

Example XII

| | |
|---|---|
| Paraffin | 14.0 |
| Mineral oil | 7.0 |
| Sorbitan monopalmitate | 7.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 29.0 |

Example XIII

| | |
|---|---|
| Paraffin | 14.0 |
| Mineral oil | 7.0 |
| Sorbitan monopalmitate | 7.0 |
| "Gantrez AN-169" | 2.0 |
| Ferric sulfate | 1.0 |
| Sodium nitrate | 10.0 |
| Nitric acid (40%) | 30.0 |
| Ammonium nitrate | 29.0 |

Example XIV

| | |
|---|---|
| Paraffin | 1.0 |
| Mineral oil | 0.5 |
| Sorbitan monopalmitate | 0.5 |
| "Gantrez AN-169" | 2.0 |
| Ferric sulfate | 1.0 |
| Sodium nitrate | 10.0 |
| Nitric acid (60%) | 30.0 |
| Ammonium nitrate | 55.0 |

Example XV

| | |
|---|---|
| Paraffin | 4.0 |
| Mineral oil | 2.0 |
| Sorbitan monopalmitate | 2.0 |
| "Gantrez AN-119" | 0.1 |
| Ferric sulfate | 0.1 |
| Sodium nitrate | 10.0 |
| Nitric acid (60%) | 30.0 |
| Ammonium nitrate | 51.8 |

Example XVI

| | |
|---|---|
| Paraffin | 4.0 |
| Mineral oil | 2.0 |
| Sorbitan monopalmitate | 2.0 |
| "Gantrez AN-119" | 10.0 |
| Ferric sulfate | 1.0 |
| Sodium nitrate | 10.0 |
| Nitric acid (60%) | 30.0 |
| Ammonium nitrate | 41.0 |

Example XVII

| | |
|---|---|
| Paraffin | 4.0 |
| Mineral oil | 2.0 |
| Sorbitan monopalmitate | 2.0 |
| "Gantrez AN-139" | 10.0 |
| Ferric sulfate | 1.0 |
| Sodium nitrate | 10.0 |
| Nitric acid (60%) | 20.0 |
| Ammonium nitrate | 51.0 |

Example XVIII

| | |
|---|---|
| Paraffin | 4.0 |
| Mineral oil | 2.0 |
| Sorbitan monopalmitate | 2.0 |
| "Gantrez AN-169" | 1.0 |
| Ferric sulfate | 1.0 |
| Nitric acid (60%) | 15.0 |
| Ammonium nitrate | 75.0 |

Example XIX

| | |
|---|---|
| Paraffin | 4.0 |
| Mineral oil | 2.0 |
| Sorbitan monopalmitate | 2.0 |
| "Gantrez AN-169" | 1.0 |
| Ferric sulfate | 1.0 |
| Nitric acid (40%) | 15.0 |
| Ammonium nitrate | 75.0 |

Example XX

| | |
|---|---|
| Paraffin | 6.0 |
| Mineral oil | 2.0 |
| Sorbitan monopalmitate | 2.0 |
| "Gantrez AN-169" | 2.0 |
| Ferric sulfate | 1.0 |
| Nitric acid (60%) | 60.0 |
| Ammonium nitrate | 27.0 |

Example XXI

| | |
|---|---|
| Paraffin | 6.0 |
| Mineral oil | 2.0 |
| Sorbitan monopalmitate | 2.0 |
| "Gantrez AN-149" | 2.0 |
| Ferric sulfate | 1.0 |
| Nitric acid (40%) | 60.0 |
| Ammonium nitrate | 27.0 |

Example XXII

| | |
|---|---|
| Paraffin | 6.0 |
| Mineral oil | 2.0 |
| Sorbitan monopalmitate | 2.0 |
| "Gantrez AN-169" | 2.0 |
| Ferric sulfate | 1.0 |
| Nitric acid (60%) | 70.0 |
| Ammonium nitrate | 17.0 |

Example XXIII

| | |
|---|---|
| Paraffin | 6.0 |
| Mineral oil | 2.0 |
| Sorbitan monopalmitate | 2.0 |
| "Gantrez AN-169" | 2.0 |
| Ferric sulfate | 1.0 |
| Nitric acid (40%) | 70.0 |
| Ammonium nitrate | 17.0 |

Example XXIV

| | |
|---|---|
| Paraffin | 6.0 |
| Mineral oil | 2.0 |
| Sorbitan monostearate | 2.0 |
| Polyacrylic acid | 2.0 |
| Ferric sulfate | 1.0 |
| Sodium nitrate | 10.0 |
| Ammonium nitrate | 47.0 |
| Nitric acid (60%) | 30.0 |

Example XXV

| | |
|---|---|
| Paraffin | 6.0 |
| Mineral oil | 2.0 |
| Sorbitan monopalmitate | 2.0 |
| "Gantrez AN-169" | 2.0 |
| Triethylenetetramine | 1.0 |
| Sodium nitrate | 10.0 |
| Nitric acid (40%) | 30.0 |
| Ammonium nitrate | 47.0 |

Example XXVI

| | |
|---|---|
| Paraffin | 6.0 |
| Mineral oil | 2.0 |
| Sorbitan monopalmitate | 2.0 |
| "Gantrez AN-169" | 2.0 |
| Polyethylenimine | 1.0 |
| Sodium nitrate | 10.0 |
| Nitric acid (60%) | 30.0 |
| Ammonium nitrate | 47.0 |

Example XXVII

| | |
|---|---|
| Paraffin | 6.0 |
| Mineral oil | 2.0 |
| "Gantrez AN-169" | 2.0 |
| Ferric sulfate | 1.0 |
| Nitric acid (60%) | 30.0 |
| Ammonium nitrate | 49.0 |
| Sodium nitrate | 10.0 |

Example XXVIII

| | |
|---|---|
| Paraffin | 6.0 |
| Mineral oil | 2.0 |
| "Gantrez AN-169" | 2.0 |
| Ferric sulfate | 1.0 |
| Sorbitan monooleate | 2.0 |
| Nitric acid (60%) | 30.0 |
| Ammonium nitrate | 47.0 |
| Sodium nitrate | 10.0 |

Example XXIX

| | |
|---|---|
| Paraffin | 6.0 |
| Mineral oil | 2.0 |
| Sorbitan monopalmitate | 2.0 |
| "Cyanogum 41" | 2.0 |
| Diethylenetriamine | 1.0 |
| Sodium nitrate | 10.0 |
| Nitric acid (60%) | 30.0 |
| Ammonium nitrate | 47.0 |

All of the above compositions have a density of 1.15–1.20 when prepared.

On testing, all of the compositions represented by the above examples are found to be cap sensitive to commercially available blasting caps.

The compositions of this invention may be used as a dynamite type product or as an effective primer for nitrocarbonitrate blasting agents.

The gelled emulsion formulas of this invention may be molded, cast or extruded into any desired shape. The preferred embodiments of the present invention require that the components be proportioned within rather specific ranges; therefore, the final mixture may be heated to drive off excess entrapped air. However, the finished gelled emulsion products of this invention suitably contain a relatively large quantity of entrapped air. The products of this invention are generally prepared within a density range of from about 0.5 to about 1.60. The subject formulas may be varied so as to produce a solid mixture by varying the carbonaceous fuel component and/or suitably extending the heating step.

The compositions of the present invention are relatively stable gelled emulsions, that is, there is little separation of the components into individual phases, for at least 8 hours and generally the compositions are stable for periods of several months.

The term "immiscible" as used herein is defined as an inability to form a stable, homogenous mixture with an aqueous solution of nitric acid containing between about 30% and about 80% by weight of nitric acid.

The term "consisting essentially of" as used in the claims, includes compositions containing the named components and the other ingredients which do not deleteriously affect the compositions for the purposes stated in the specification.

It is to be understood that the foregoing detailed description is given merely by way of illustration and that many variations may be made therein without departing from this invention.

What is claimed is:

1. A gelled emulsion blasting composition consisting essentially of an aqueous solution of nitric acid; an inorganic nitrate; an immiscible carbonaceous fuel; an acid-resistant stabilizer, or an acid-resistant surfactant, or both; a gelatin catalyst; and entrapped air, said blasting composition having a density of from about 0.5 gm./cc. to about 1.60 gm./cc.

2. A gelled emulsion blasting composition of claim 1 wherein the inorganic nitrate is a compound selected from the group consisting of ammonium nitrate, potassium nitrate and sodium nitrate.

3. A gelled emulsion blasting composition of claim 1 wherein the acid-resistant surfactant is a compound selected from the group consisting of sorbitan monooleate, sorbitan monopalmitate, and sorbitan monostearate.

4. A gelled emulsion blasting composition of claim 1 wherein the acid-resistant stabilizer is a compound selected from the group consisting of colloidal silica, polymers and copolymers of acrylamide, a copolymer of methyl vinyl ether-maleic anhydride, polyacrylic acid and water soluble acrylic polymers.

5. A gelled emulsion blasting composition of claim 1 wherein the immiscible carbonaceous fuel is selected from the group consisting of paraffin, paraffin-based waxes, mineral oil, saturated fatty acid, polyethylene glycols, higher alcohols, vegetable oils and powdered carbon.

6. A gelled emulsion blasting composition of claim 1 wherein the concentration of the aqueous nitric acid solution is between about 30% to about 80% by weight of nitric acid.

7. A gelled emulsion blasting composition of claim 1 wherein the gelation catalyst is selected from the group consisting of ferric sulfate, aluminum sulfate, stannic chloride, polyethylenimine nitrate and triethylenetetramine.

8. A gelled emulsion blasting compisition of claim 1 which includes a non-explosive propagation sustaining material.

9. A gelled emulsion blasting composition of claim 8 wherein the non-explosive propagation sustaining material is expanded perlite having a size range that will pass through from about a No. 8 U.S.S. screen to about a No. 100 U.S.S. screen.

References Cited

UNITED STATES PATENTS

| | | | |
|---|---|---|---|
| 3,164,503 | 1/1965 | Gehrig | 149—74 X |
| 3,242,019 | 3/1966 | Gehrig | 149—18 |
| 3,282,754 | 11/1966 | Gehrig | 149—74 |
| 3,288,661 | 11/1966 | Swisstack | 149—2 X |
| 3,296,044 | 1/1967 | Gehrig | 149—74 X |
| 3,376,176 | 4/1968 | Gehrig | 149—74 X |

CARL D. QUARFORTH, Primary Examiner

MELVIN J. SCOLNICK, Assistant Examiner

U.S. Cl. X.R.

149—18, 21, 46, 61, 74, 109

PO-1050
(5/69)

UNITED STATES PATENT OFFICE
CERTIFICATE OF CORRECTION

Patent No. 3,470,041        Dated September 30, 1969

Inventor(s) Neil E. Gehrig

It is certified that error appears in the above-identified patent and that said Letters Patent are hereby corrected as shown below:

Column 5, line 63, delete the word "amulsion" and substitute -- emulsion --

Column 6, line 32, delete the word "prevent" and substitute -- present --

Column 12, line 4, delete the word "gelatin" and substitute -- gelation --

SIGNED AND
SEALED
JUL 14 1970

(SEAL)
Attest:

Edward M. Fletcher, Jr.
Attesting Officer

WILLIAM E. SCHUYLER, JR.
Commissioner of Patents